UNITED STATES PATENT OFFICE.

ALFRED H. COWLES, OF SEWAREN, NEW JERSEY, AND ADOLF KAYSER, DECEASED, BY GRACE KAYSER, ADMINISTRATRIX, OF LOCKPORT, NEW YORK, ASSIGNORS TO ELECTRIC SMELTING AND ALUMINUM COMPANY, OF LOCKPORT, NEW YORK, A CORPORATION OF ILLINOIS.

PROCESS OF MANUFACTURING SODIC-SILICO ALUMINATE AND HYDROCHLORIC ACID.

1,041,599. Specification of Letters Patent. Patented Oct. 15, 1912.

No Drawing. Application filed June 23, 1911. Serial No. 635,050.

*To all whom it may concern:*

Be it known that we, ALFRED H. COWLES and GRACE KAYSER, administratrix of the estate of ADOLF KAYSER, deceased, both citizens of the United States, residing, respectively, at Sewaren, county of Middlesex, and State of New Jersey, and Lockport, county of Niagara, and State of New York, have invented a certain new and useful Improvement in Processes of Manufacturing Sodic-Silico Aluminate and Hydrochloric Acid, of which the following is a full, clear, and exact description.

The present invention relates to the manufacture of sodic-silico aluminate and hydrochloric acid.

The object of the invention has been to improve the manufacture of these compounds so that the process shall be under better control with less waste and more uniform products.

The above object it will be seen is attained by the embodiment of our invention described in the following specification.

As is well known, silica as well as alumina, or both combined will, in the presence of steam, decompose alkaline chlorids at a high temperature. The alkaline oxid formed through the reaction of the steam upon the chlorid combines with silica or alumina or both, as the case may be, while the chlorin unites with the hydrogen of the steam to form hydrochloric acid.

The method of procedure which forms the subject of the present application is an improvement upon the method described in the U. S. Patent No. 376,409, January 10, 1888 in which is described the arrangement of bricks of the reacting material in a furnace fed by steam and a heating flame from the top, the waste products and gaseous hydrochloric acid formed being drawn from the bottom.

Our improved procedure in its broadest aspect is applicable to such a mixture of materials as are set forth in that patent, but it is of especial value when that mixture is modified by introducing a certain amount of carboniferous material, preferably 3 to 10 per cent. The mix is formed into bricks of different size or the same external dimensions with perforations therethrough. The bricks are then placed in a down draft furnace to which burning gases and steam are admitted from above. The charge is so arranged in this furnace that the actual mass per cubic unit at the bottom is less than at the top. This result may be achieved by placing perforated bricks at the bottom of the charge or by using smaller bricks with substantially the same interspacing as employed at the top, and we prefer that this graduation from top to bottom be uniform and gradual. We find that by this arrangement the progress of the zone of action through the furnace can be controlled so that the bricks at the bottom of the furnace are finished at substantially the same time as those at the top. This is an important practical advantage, since it has been found in practising the older processes that the bricks in the upper part of the charge become thoroughly converted while the bricks in the lower part are but yet partially changed, so that it has been necessary to draw the charge in a partially finished condition. Furthermore, the mechanical and chemical difficulties have been such as to prevent the older processes from being forced or hastened so as to cause the reacting zone to advance to the bottom of the furnace quickly enough to cause the bricks therein to be finished anywhere near contemporaneously with those in the upper portion of the furnace.

The reason for the improved results achieved by our arrangement is that the reaction effected by the steam upon the solid mass of the bricks is initially a superficial one and the rate of its progress into the mass of each brick is dependent upon the gradual penetration of the steam and sufficient heat to effect the reaction. At the beginning of the process the zone of reaction will extend only to such depth in the furnace as the supply of heat will permit considering the superficial area presented by the mass of material within the zone. As the reaction progresses from the outside faces into the interior of a brick the area involved in reaction in such individual brick becomes less and consequently the total surface under action within the original depth of the reacting zone will become less. Therefore more heat will be available for extending the furnace zone downward.

If the bricks in the lower part of the furnace present the same mass per cubic unit to the reagent gases, as is the case in the former processes, the result is that the reaction is completed in the bricks at the upper part of the furnace before the bricks in the lower part have been more than partially converted. If, however, the mass of the bricks per cubic unit of contents is diminished toward the bottom of the furnace, the furnace zone of reaction spreads rapidly after the partial conversion of the bricks in the upper portion, and, by attention, the charge may be adjusted in such manner that the bricks in the lower portion will be completely converted at substantially the same time with the completion of the bricks in the upper portion.

With the improvement which we have here described, however, and particularly in conjunction with the introduction of carboniferous material into the mix, the progress of the zone of action through the furnace can be increased to such a rate that the reaction zone will exist substantially throughout the furnace at the same time and the process therefore will be more economical in the matters of heat, waste, and incompletely converted bricks. The carboniferous material as it is consumed in the treatment of the charge causes a reduction to take place much more quickly and thoroughly than could be accomplished by treatment of the material with a reducing gas acting externally, and furthermore, the admixture of carbonaceous material necessitates the use of only sufficient gas to give the necessary heat. Therefore air may be introduced with the gas which will result in creating substantially an oxidized atmosphere surrounding the material being treated, and this prevents an excessive reduction of the outer surface of the material which usually obtains where a gas alone acts as the reducing agent.

Having thus described our invention, we claim:

1. The herein described method which comprises arranging bricks containing alkaline chlorid and a compound containing alumina and silica so that the mass of the charge per cubic unit decreases from top to bottom, and forcing through the charge from top to bottom steam and the flame from a gaseous fuel.

2. The herein described method which comprises arranging bricks of the material to be treated so that the mass of the charge per cubic unit decreases from top to bottom of the charge and forcing through the charge from top to bottom a stream of gaseous material adapted to react with the charge.

3. The herein described method which comprises arranging segregated masses of material to be treated so that the quantity of material per cubic unit decreases gradually from the top toward the bottom and forcing through the charge from the top to the bottom a stream of gaseous material adapted to react with the charge.

In testimony whereof, we hereunto affix our signatures in the presence of two witnesses.

ALFRED H. COWLES.
GRACE KAYSER,
*Administratrix of the estate of Adolf Kayser.*
Witnesses to signature of Alfred H. Cowles:
  ALBERT STETSON,
  CYRUS D. HUTCHINSON.
Witnesses to signature of Grace Kayser:
  F. J. DAVIS,
  C. B. TRAVIS.

---

Copies of this patent may be obtained for five cents each, by addressing the "Commissioner of Patents, Washington, D. C."